US008842676B2

(12) United States Patent
Park et al.

(10) Patent No.: US 8,842,676 B2
(45) Date of Patent: Sep. 23, 2014

(54) METHODS AND SYSTEMS FOR UPLINK SCHEDULING USING WEIGHTED QOS PARAMETERS

(75) Inventors: Jong Ro Park, San Ramon, CA (US); Chun Woo Lee, San Ramon, CA (US); Doo Seok Kim, Pleasanton, CA (US); Kyoung Cheol Oh, Danville, CA (US); Kuo-Chun Lee, San Diego, CA (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 874 days.

(21) Appl. No.: 12/351,799

(22) Filed: Jan. 9, 2009

(65) Prior Publication Data
US 2010/0177709 A1 Jul. 15, 2010

(51) Int. Cl.
H04W 72/02 (2009.01)
H04W 72/08 (2009.01)
H04W 72/12 (2009.01)

(52) U.S. Cl.
CPC ...... H04W 72/1268 (2013.01); H04W 72/1236 (2013.01)
USPC ...... 370/395.43; 370/230; 370/329

(58) Field of Classification Search
USPC .............. 370/229–230.1, 310–350, 370/395.4–395.43, 412; 455/450–452.2
See application file for complete search history.

(56) References Cited

U.S. PATENT DOCUMENTS

| 7,492,735 | B2 * | 2/2009 | Zeira et al. ............... 370/329 |
| 7,599,321 | B2 * | 10/2009 | Lee et al. ............... 370/320 |
| 7,616,596 | B2 * | 11/2009 | Lee et al. ............... 370/326 |
| 2009/0010202 | A1 * | 1/2009 | Masayuki et al. ............ 370/328 |
| 2010/0214992 | A1 * | 8/2010 | Hart et al. ............... 370/329 |

OTHER PUBLICATIONS

Maode Ma et al "An Efficient Scheduling Algorithm for QoS Provisioning in WiMax Netowrks", IEEE 2008.*
Roy et al, "A QoS Weight Based Multimedia Uplink Scheduler for IEEE 802.11e WLAN", IEEE, Feb. 24, 2007, pp. 446-451.*
International Search Report & Written Opinion—PCT/US2010/020546, International Search Authority—European Patent Office—Apr. 20, 2010.
Maode Ma et al: "An efficient scheduling algorithm for QoS provisioning in WiMAX networks" Its Telecommunications, 2008. ITST 2008. 8th International Conference on, IEEE, Piscataway, NJ, USA LNKDDOI: 10.1109/ITST.2008.4740264, Oct. 24, 2008, pp. 240-245, XP031402753 ISBN: 978-1-4244-2857-1 section 2, paragraph B; p. 2 section 3, paragraphs A and B; pp. 2-3.
Xiaofeng Bai et al: "WLC22-3: New Distributed QoS Control Scheme for IEEE 802.16 Wireless Access Networks" Global Telecommunications Conference, 2006. Globecom "06. IEEE, IEEE, PI, Nov. 1, 2006, pp. 1-5, XP031075743.
So-In, C., Jain, R., Tamimi, A.: Scheduling in IEEE 802.16e Mobile WiMAX Networks: Key Issues and a Survey, IEEE Journal on Selected Areas in Communications, vol. 27, No. 2, Feb. 2009, pp. 156-171, received Jan. 2008, revised Oct. 2008, copyright 2008.
Taiwan Search Report—TW099100410—TIPO—Dec. 8, 2012.

* cited by examiner

Primary Examiner — Habte Mered
(74) Attorney, Agent, or Firm — Tyler J. Overall (57) ABSTRACT

Certain embodiments of the present disclosure proposes a flexible method for scheduling of an uplink transmission simultaneously considering all active connections of a mobile station. A decision on scheduling priority can be made based on a metric that comprises QoS parameters and current traffic measurements. The weight factors may be applied for every QoS parameter per schedule type providing flexibility of the scheduling algorithm. The proposed scheduling algorithm may be applied to satisfy different QoS requirements for each service provider and application by changing weight factors if required.

24 Claims, 8 Drawing Sheets

| Items/Schedule Types | UGS | ERT-PS | RT-PS | NRT-PS | BE |
|---|---|---|---|---|---|
| Maximum Sustained Traffic Rate | x | x | x | x | x |
| Minimum Reserved Traffic Rate | x | x | x | x | |
| Maximum Latency | x | x | x | | |
| Tolerated Jitter | x | | | | |
| Traffic Priority | | x | x | x | |
| Request/Transmission Policy | x | x | x | x | x |
| Unsolicited Grant Interval | x | | | | |
| Unsolicited Polling Interval | | x | x | | |

FIG. 4

| QoS Parameters/ Connections | UGS | ERT-PS/ RT-PS | NRT-PS | BE | Basic | Primary Management |
|---|---|---|---|---|---|---|
| Schedule Type | WF_ST_1 | WF_ST_2 | WF_ST_3 | WF_ST_4 | WF_ST_5 | WF_ST_6 |
| Traffic Priority | WF_TP_1 | WF_TP_2 | WF_TP_3 | WF_TP_4 | WF_TP_5 | WF_TP_6 |
| Minimum Reserved Rate | WF_R_1 | WF_R_2 | WF_R_3 | WF_R_4 | WF_R_5 | WF_R_6 |
| Maximum Latency | WF_L_1 | WF_L_2 | WF_L_3 | WF_L_4 | WF_L_5 | WF_L_6 |

METHODS AND SYSTEMS FOR UPLINK SCHEDULING USING WEIGHTED QOS PARAMETERS

TECHNICAL FIELD

The present disclosure generally relates to communication, and more specifically to a method for scheduling an uplink transmission simultaneously considering all active connections of a mobile station.

SUMMARY

Certain embodiments provide a method for scheduling uplink connections of a mobile station (MS). The method generally includes setting a weight factor for Quality of Service (QoS) parameters for different types of connections, updating a traffic status metric for active connection of the MS, calculating a QoS metric for each active connection of the MS based on said weight factors for the plurality of QoS parameters per corresponding connection and on the traffic status metric for that same connection, and determining a scheduling order of all active connections of the MS according to the QoS metric for each connection.

Certain embodiments provide an apparatus for scheduling uplink connections of a mobile station (MS). The method generally includes logic for setting a weight factor for Quality of Service (QoS) parameters for different types of connections, logic for updating a traffic status metric for active connection of the MS, logic for calculating a QoS metric for each active connection of the MS based on said weight factors for the plurality of QoS parameters per corresponding connection and on the traffic status metric for that same connection, and logic for determining a scheduling order of all active connections of the MS according to the QoS metric for each connection.

Certain embodiments provide an apparatus for scheduling uplink connections of a mobile station (MS). The method generally includes means for setting a weight factor for Quality of Service (QoS) parameters for different types of connections, means for updating a traffic status metric for active connection of the MS, means for calculating a QoS metric for each active connection of the MS based on said weight factors for the plurality of QoS parameters per corresponding connection and on the traffic status metric for that same connection, and means for determining a scheduling order of all active connections of the MS according to the QoS metric for each connection.

Certain embodiments provide a computer-program product for scheduling uplink connections of a mobile station (MS), comprising a computer readable medium having instructions stored thereon, the instructions being executable by one or more processors. The instructions generally include instructions for setting a weight factor for Quality of Service (QoS) parameters for different types of connections, instructions for updating a traffic status metric for active connection of the MS, instructions for calculating a QoS metric for each active connection of the MS based on said weight factors for the plurality of QoS parameters per corresponding connection and on the traffic status metric for that same connection, and instructions for determining a scheduling order of all active connections of the MS according to the QoS metric for each connection.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The Worldwide Interoperability for Microwave Access (WiMAX) standard specifies that a mobile station (MS) can simultaneously support multiple uplink (UL) connections for different purposes and with different Quality of Service (QoS) requirements. There are three dedicated connections at the MS for the purpose of sending and receiving control messages. These control connections can be utilized to allow differentiated levels of QoS to be applied for carrying Media Access Control (MAC) management traffic. However, no specific QoS parameters are defined for control connections. In addition, the WiMAX standard specifies five different schedule types for all user data traffic representing transport connections. The transport connections may have one service flow, and specific QoS parameters may be defined by a schedule type. The service flow can be characterized by a set of QoS parameters such as latency, jitter, throughput assurance, etc.

Before broadcasting control messages and user data traffic, the MS may need to request an UL bandwidth based on QoS requirements of each connection. However, in order to reduce the MAC overhead, the UL bandwidth may be addressed to the Basic connection identification (ID) of the MS and not to individual connection identifiers (CIDs). If the MS receives a smaller UL data grant than expected (or requested), than the MS may need to decide which connection is scheduled first in order to satisfy QoS requirements of each connection and to provide a fair schedule. In the prior art, a scheduling priority is given to a particular scheduling type. For example, the Unsolicited Grant Service (UGS) traffic may be scheduled first, although transmission latencies of other scheduling types may be higher than the maximum allowable latency specified by the QoS requirements.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One specific example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

Figure 1:
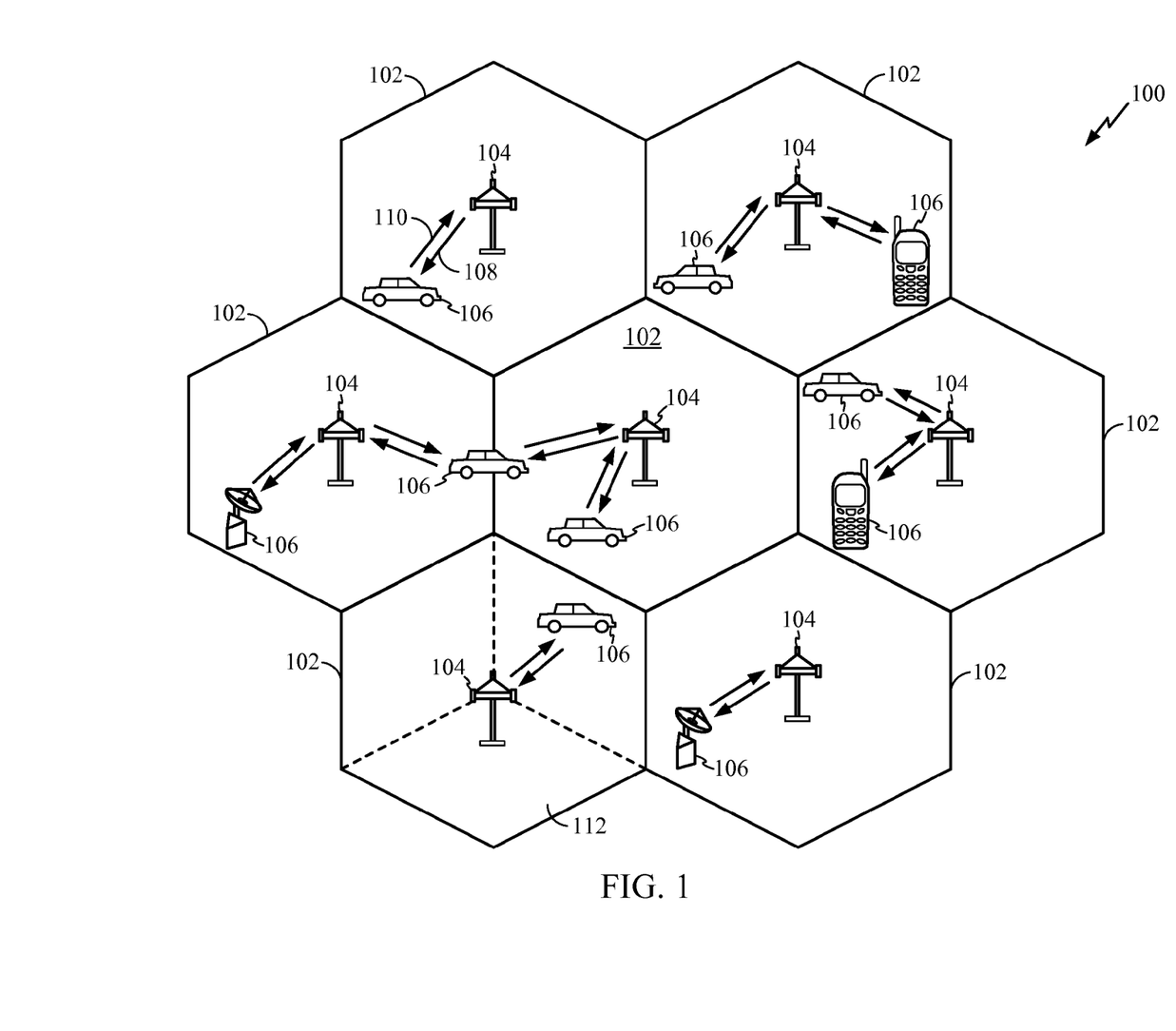
FIG. 1 illustrates an example wireless communication system, in accordance with certain embodiments of the present disclosure.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink (DL) 108, and a communication link that facilitates transmission from a user terminal 106 to a base station 104 may be referred to as an uplink (UL) 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
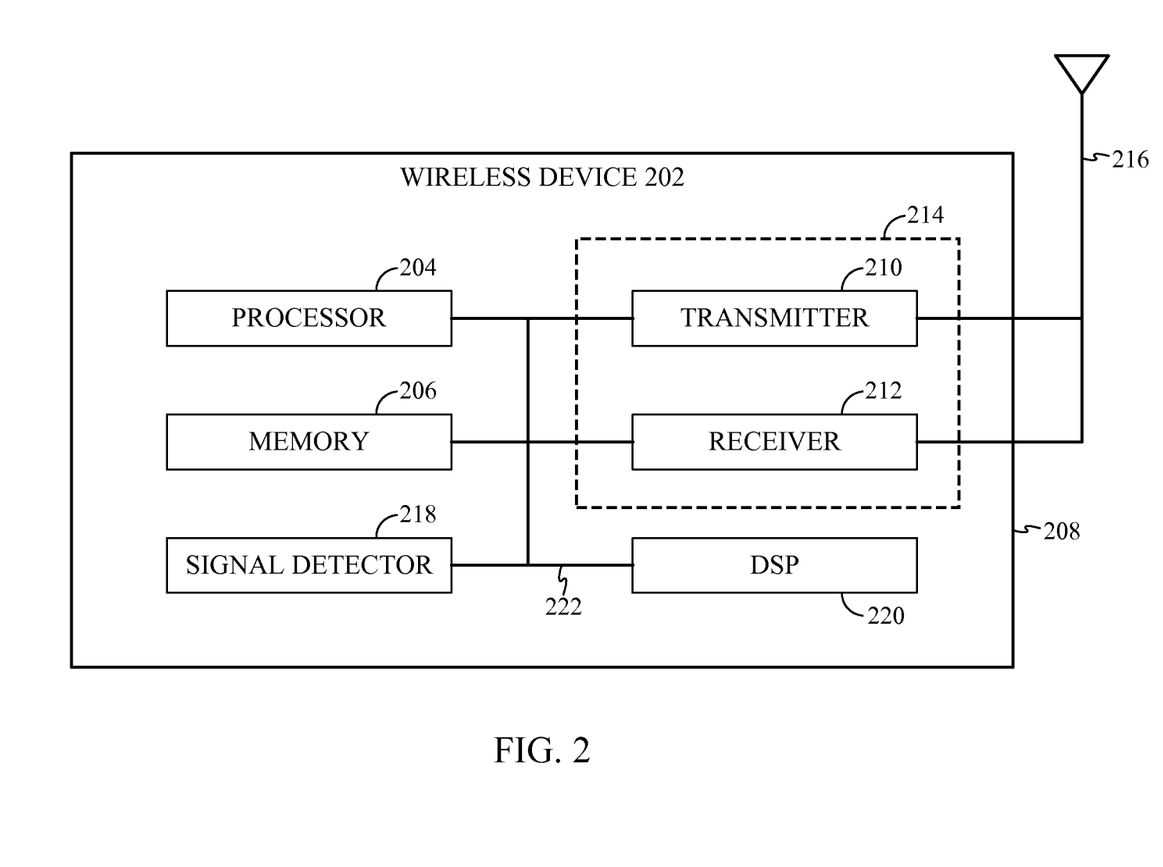
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
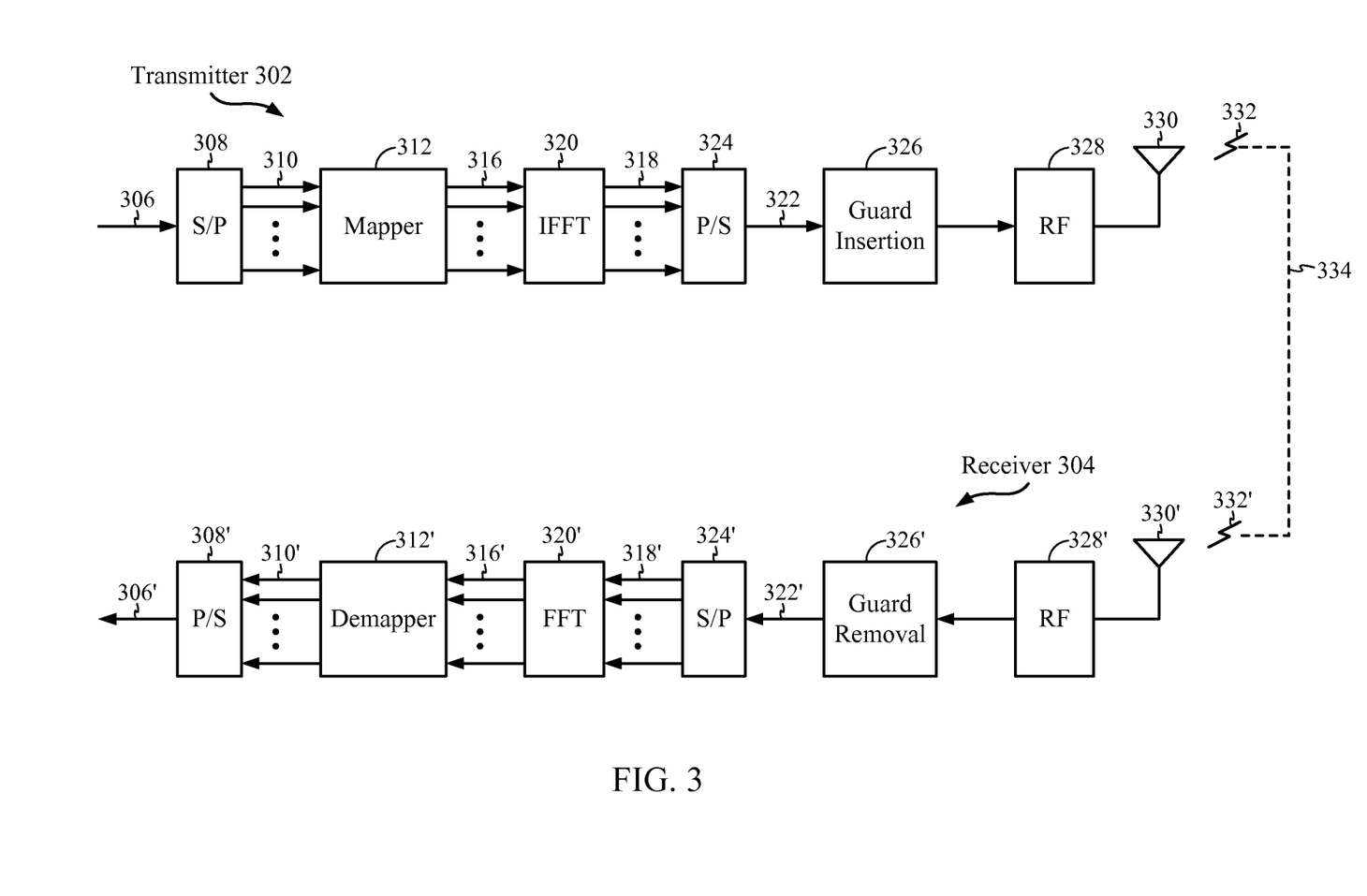
FIG. 3 illustrates an example transmitter and an example receiver that may be used within a wireless communication system in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into M parallel data streams 310.

The M parallel data streams 310 may then be provided as input to a mapper 312. The mapper 312 may map the M parallel data streams 310 onto M constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output M parallel symbol streams 316, each symbol stream 316 corresponding to one of the M orthogonal subcarriers of the inverse fast Fourier transform (IFFT) 320. These M parallel symbol streams 316 are represented in the frequency domain and may be converted into M parallel time domain sample streams 318 by an IFFT component 320.

A brief note about terminology will now be provided. M parallel modulations in the frequency domain are equal to M modulation symbols in the frequency domain, which are equal to M mapping and M-point IFFT in the frequency domain, which is equal to one (useful) OFDM symbol in the time domain, which is equal to M samples in the time domain. One OFDM symbol in the time domain, NS, is equal to NCP (the number of guard samples per OFDM symbol)+M(the number of useful samples per OFDM symbol).

The M parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the M parallel time-domain symbol streams 318', each of which corresponds to one of the M orthogonal subcarriers. A fast Fourier transform (FFT) component 320' may convert the M parallel time-domain symbol streams 318' into the frequency domain and output M parallel frequency-domain symbol streams 316'.

A demapper 312' may perform the inverse of the symbol mapping operation that was performed by the mapper 312 thereby outputting M parallel data streams 310'. A P/S converter 308' may combine the M parallel data streams 310' into a single data stream 306'. Ideally, this data stream 306' corresponds to the data 306 that was provided as input to the transmitter 302. Note that elements 308', 310', 312', 316', 320', 318' and 324' may all be found in a baseband processor 340'.

Exemplary Uplink Scheduling

The present disclosure proposes a flexible scheduling method that considers a plurality of Quality of Service (QoS) parameters per connection of a mobile station (MS). A priority decision can be made based on the metric that comprises QoS parameters and current traffic measurements. The weight factors may be applied for every QoS parameter per each connection providing flexibility of the scheduling algorithm. The proposed scheduling algorithm may be applied to satisfy different requirements for each service and application by changing weight factors if required. Because different weight factors may be applied on different QoS parameters, even if the schedule type of a connection is more important than other schedule types, if that connection already satisfies all QoS requirements, then other connections may obtain higher priority. The proposed scheduling approach can be applied to all data communication protocols that support a concept of QoS.

Figure 4:
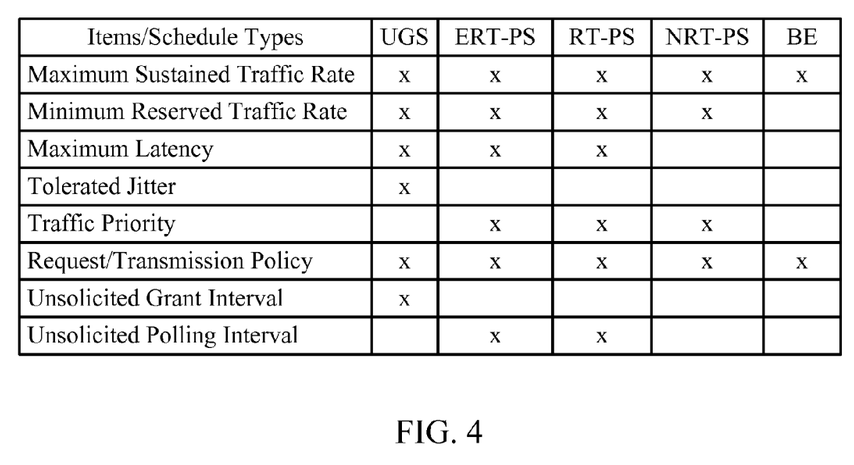
FIG. 4 shows Quality of Service (QoS) parameters that are considered for different scheduling types in the Institute of Electrical and Electronics Engineers (IEEE) 802.16 standard in accordance with certain embodiments of the present disclosure.

FIG. 4 shows QoS parameters that may be considered for different scheduling types in the IEEE 802.16 standard. For example, as labeled in FIG. 4, an Unsolicited Grant Service (UGS) traffic should satisfy the following QoS parameters (i.e., requirements): maximum sustained traffic rate, minimum reserved traffic rate, maximum latency, tolerated jitter, request/transmission policy and unsolicited grant interval. As shown in FIG. 4, there are five scheduling types defined by the IEEE 802.16 standard: the UGS, an Extended Real-Time Variable-Rate (ERT-VR) which is also called an Extended Real-Time Polling Service (ERT-PS), a Real-Time Variable-Rate (RT-VR) which is also called a Real-Time Polling Service (RT-PS), a Non Real-Time Variable-Rate (NRT-VR) which is also called a Non-Real-Time Polling Service (NRT-PS), and a Best Effort (BE).

Figure 5:
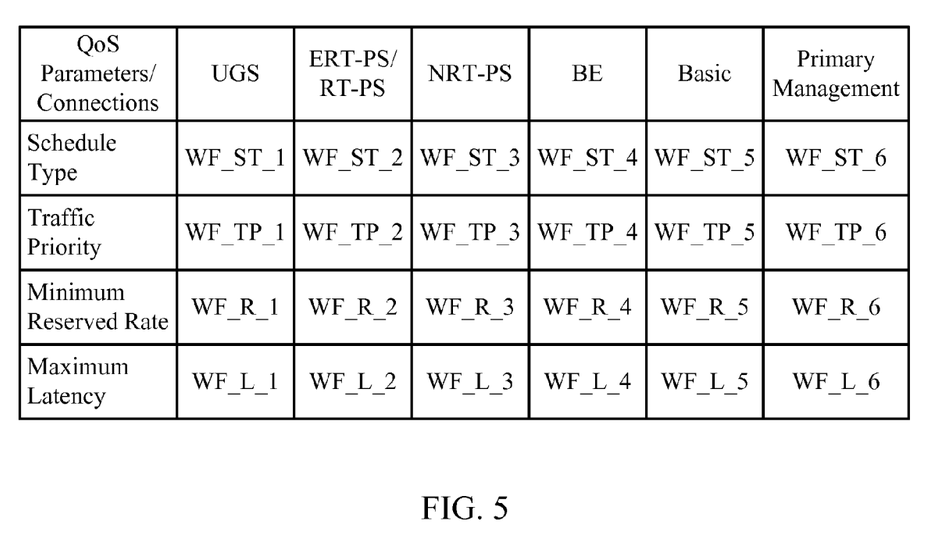
FIG. 5 shows weight factors associated with QoS parameters for different scheduling types in accordance with certain embodiments of the present disclosure.

FIG. 5 shows weight factors associated with different QoS parameters per scheduling type. A Basic connection and a Primary Management connection are also considered. By defining different weight values for one QoS parameter along different scheduling types, a preference on the specific scheduling type may be provided. For example, a bigger weight factor associated with the minimum reserved traffic rate may be set for the UGS traffic than for the NRT-VR connection because the UGS traffic may be more important and sensitive to the traffic rate.

In addition, by setting different weight values for the scheduling type along a plurality of QoS parameters, the preference on the specific QoS parameter for the scheduling type may be provided. For example, the maximum latency may be more important than the minimum reserved rate for the UGS traffic. Therefore, the weight factor of the maximum latency is set to be greater than the weight factor of the minimum reserved rate for this particular connection. It can be also observed from FIG. 5 that the ERT-PS and the RT-PS schedule types may have identical weight values for all specified QoS parameters.

Figure 6:
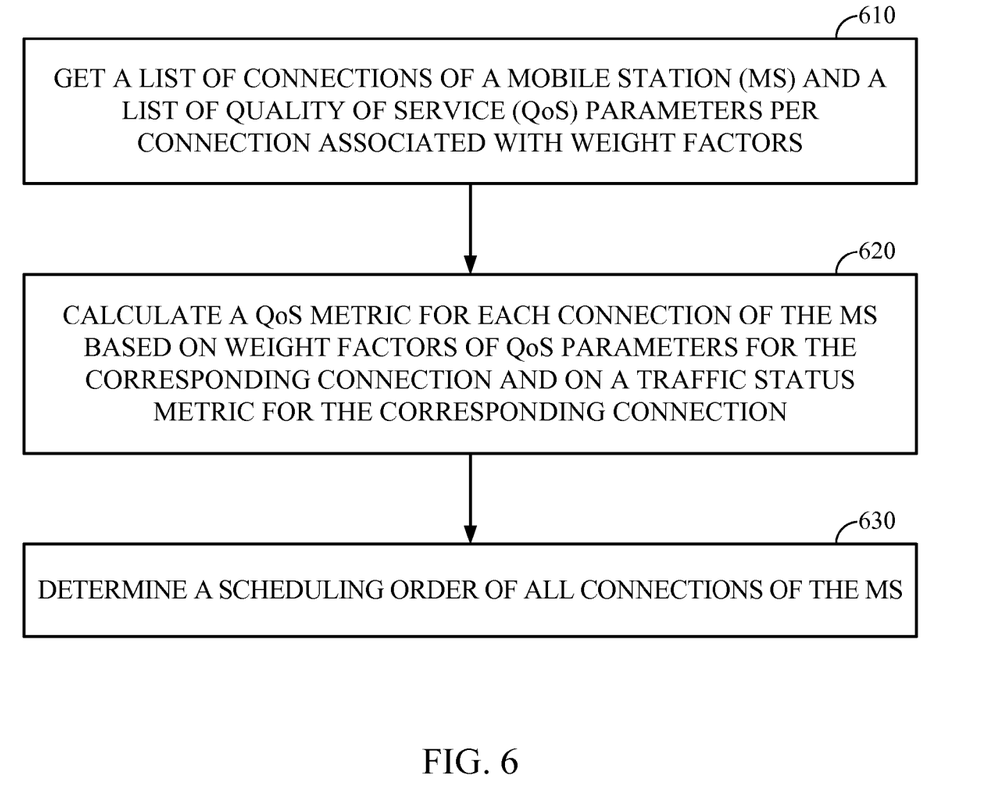
FIG. 6 shows a process of determining a scheduling order of all connections of a mobile station (MS) in accordance with certain embodiments of the present disclosure.

FIG. 6 shows a process of determining a scheduling order of all active connections of the MS. At a beginning of the process 600, at 610, a list of connections of the MS may be obtained, as well as a list of Quality of Service (QoS) parameters per connection associated with weight factors as shown in FIG. 5. At 620, a QoS metric may be calculated for each connection of the MS based on weight factors of QoS parameters for the corresponding connection and on a traffic status metric for that particular connection. Once the QoS metric is calculated for every connection of the MS, the scheduling order of all active connections of the MS may be determined, at 630.

The traffic status metric may be updated individually for every scheduling type. One particular parameter of the traffic rate metric is a rate factor $r_f$. The rate factor may be determined according to following expressions:

$$r_f = 1 \text{ if } Max_R > Avg_R \geq Min_R \quad (1)$$
and scheduling type is *UGS* or *ERT-PS*, $$r_f = 0 \text{ if } Max_R > Avg_R \geq Min_R \quad (2)$$
and scheduling type is *RT-PS*, *NRT-PS* or *BE*, $$r_f = 0 \text{ if } Avg_R \geq Max_R \quad (3)$$
and scheduling type is *UGS*, *ERT-PS*, *RT-PS*, *NRT-PS* or *BE*, $$r_f = ((Min_R - Avg_R) \cdot 90/Min_R)/10 + 1 \text{ if } Avg_R < Min_R \quad (4)$$
and scheduling type is *UGS* or *ERT-PS*, $$r_f = ((Min_R - Avg_R) \cdot 100/Min_R)/10 \text{ if } Avg_R < Min_R \quad (5)$$
and scheduling type is *RT-PS*, *NRT-PS* or *BE*, where $Avg_R$ is an average measured traffic rate, $Min_R$ is a minimum configured reserved traffic rate, and $Max_R$ is a maximum configured sustained traffic rate.

Another parameter of the traffic status metric is a latency factor $l_f$. The latency factor may be computed according to the following expression:

$$l_f = \begin{cases} 0, & \text{if NON\_ALLOC\_Intv} \leq Max_L \\ ((\text{NON\_ALLOC\_Intv} - Max_L) \cdot 100/Max_L)/10 & \text{otherwise} \end{cases} \quad (6)$$

where, NON_ALLOC_Intv represents a measured non-allocated interval, and $Max_L$ is a maximum configured latency.

Figure 7:
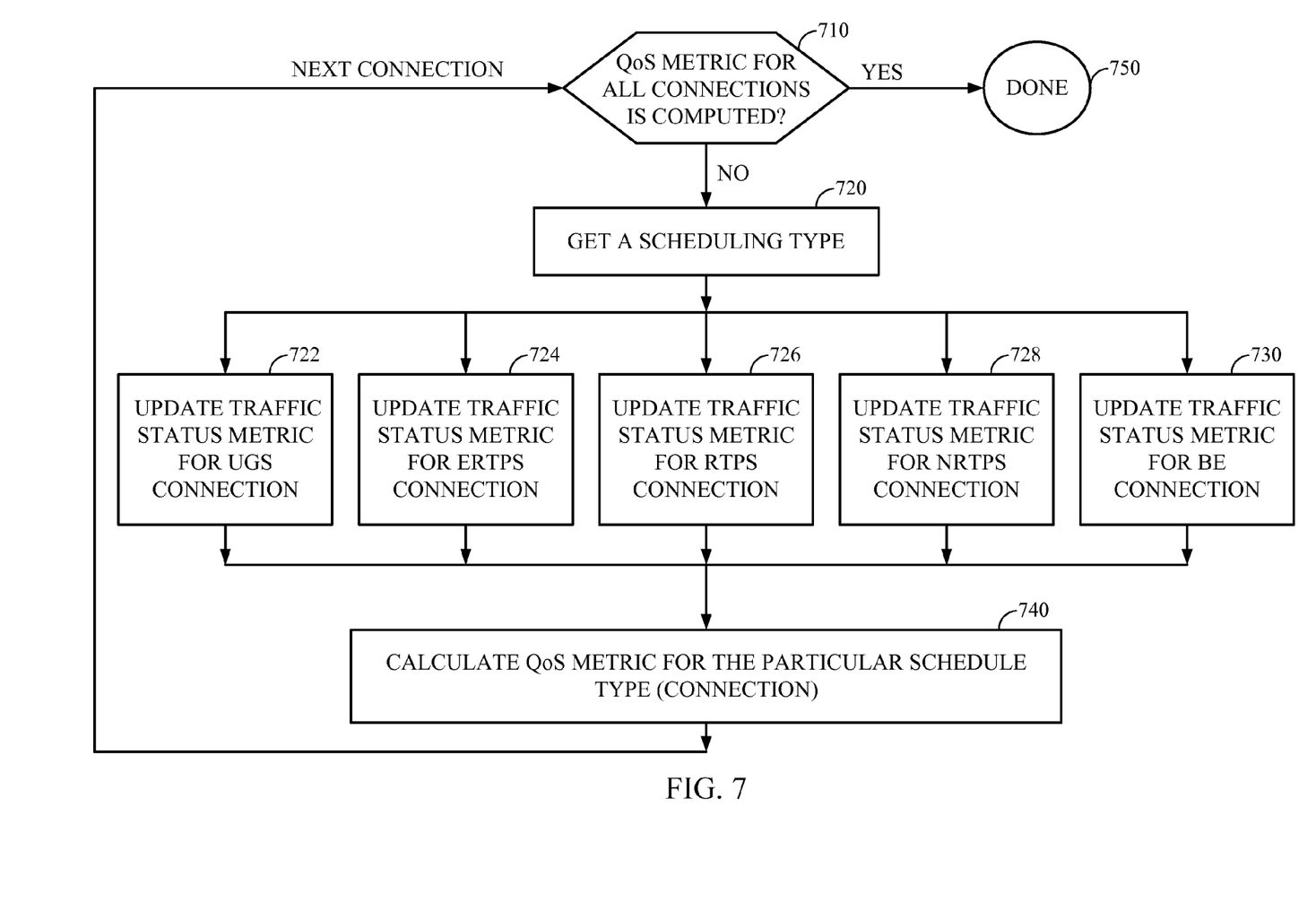
FIG. 7 shows a process of computing a QoS metric for each connection of the MS in accordance with certain embodiments of the present disclosure.

FIG. 7 shows a process of computing the QoS metric for each connection of the MS. The QoS metric may be utilized to determine a scheduling order of all active connections of the MS. If the QoS metric is not yet computed for all active connections of the MS (decision step 710), then a scheduling type of a particular connection may be obtained, at 720. Once the scheduling type of the connection is known, the traffic status metric (such as a traffic priority factor, the rate factor, the latency factor, etc) may be updated for the corresponding connection, at 722 if the connection is the UGS connection, at 724 if the connection is the ERT-PS connection, at 726 if the connection is the RT-PS connection, at 728 if the connection is the NRT-PS connection, at 730 if the connection is the BE connection. At 740, the QoS metric may be calculated for the particular connection of the MS based on weight factors of QoS parameters specified in FIG. 5 for that connection and on the updated traffic status metric for the connection.

The QoS metric may be calculated by the following formula:

QoS_Metric=*Fst*(schedule type)+*Ftp*(scheduling_type,traffic_priority)++*Frf*(scheduling_type,*rf*)+*Flf*(scheduling_type,*lf*), (7)

where Fst is a function that retrieves weight factor of scheduling type for given scheduling type, and:

*Ftp*=traffic_priority*(weight factor of traffic priority for given scheduling type), (8)

*Frf*=*rf**(weight factor of rate metric for given scheduling type), (9)

*Flf*=*lf**(weight factor of latency metric for given scheduling type). (10)

The scheduling priority may be given to a connection with a larger QoS metric over a connection with a smaller QoS metric. The connection that is associated with the largest QoS metric value among all active connections of the MS may be selected as the first connection from which a buffered traffic may be loaded onto the allocated UL bandwidth.

Weight factors for the Basic connection and the Primary Management connection may be typically set with large values to satisfy the following condition for the QoS metric:

QoS_Metric(Basic)>QoS_Metric(Primary Management)>QoS_Metric(UGS). (11)

For certain embodiments of the present disclosure the UGS connection may be configured to have higher priority than the Basic connection. Therefore, weight factors from FIG. 5 associated with the Basic connection may be set accordingly resulting into the QoS metric smaller than the QoS metric of the UGS connection.

Figure 6A:
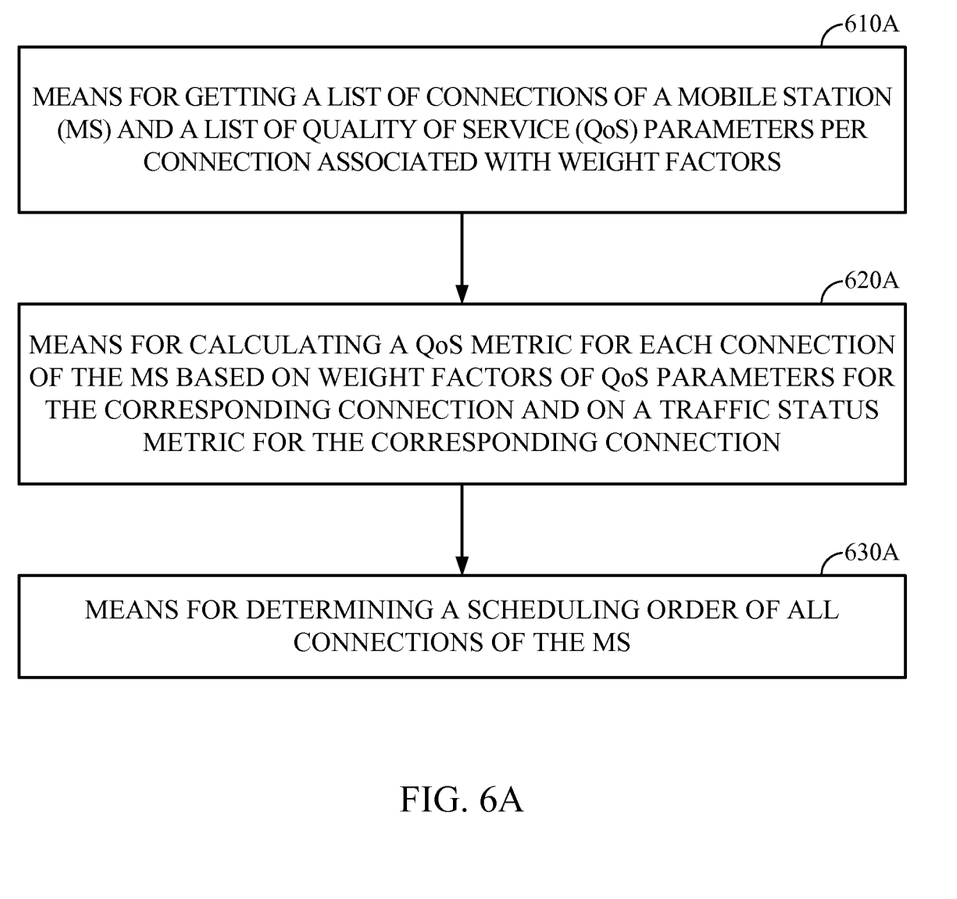
FIG. 6A illustrates example components capable of performing the operations illustrated in FIG. 6.
Figure 7A:
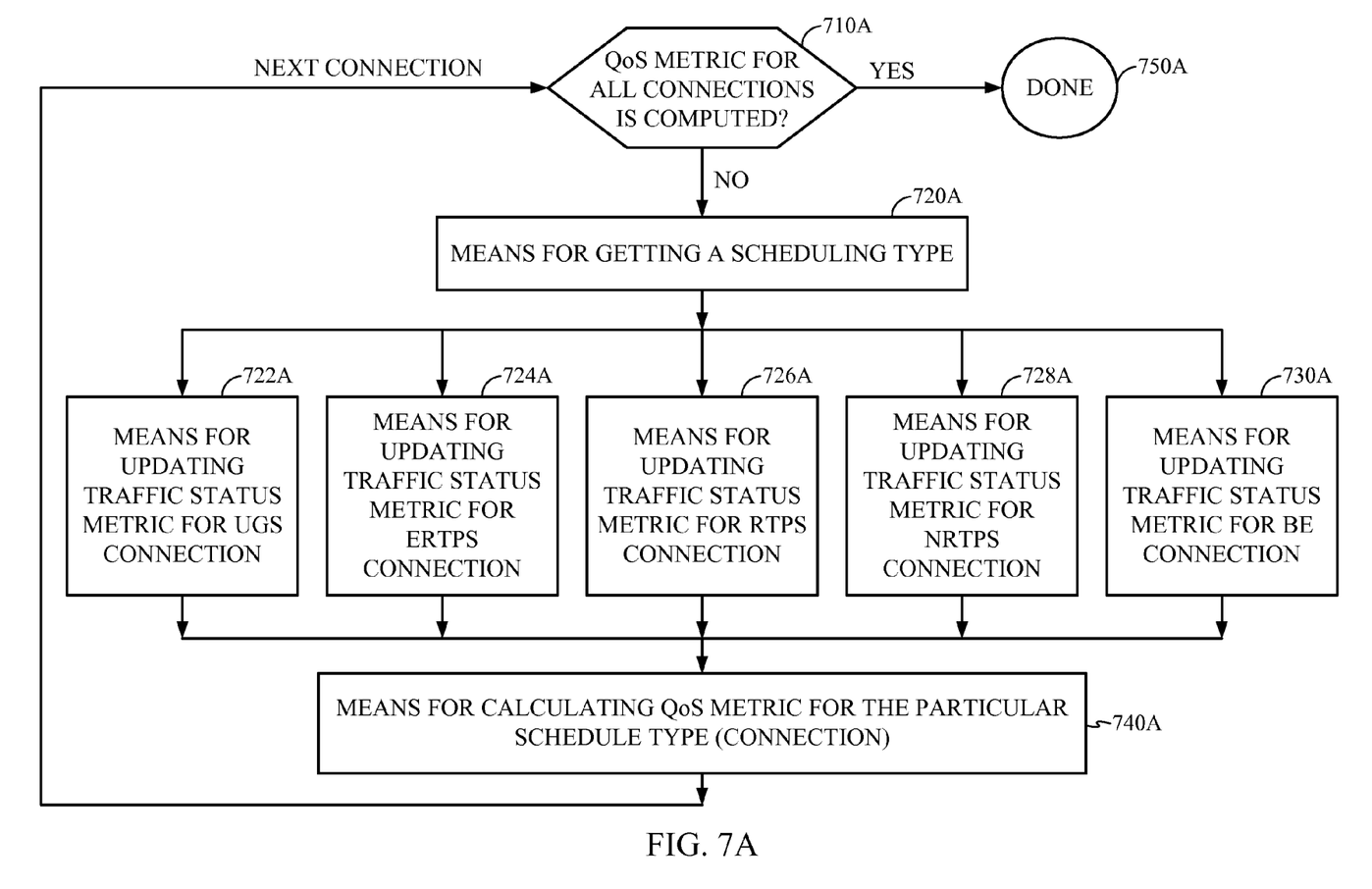
FIG. 7A illustrates example components capable of performing the operations illustrated in FIG. 7.

The various operations of methods described above may be performed by various hardware and/or software component(s) and/or module(s) corresponding to means-plus-function blocks illustrated in the Figures. For example, blocks 610-630 illustrated in FIG. 6 correspond to means-plus-function blocks 610A-630A illustrated in FIG. 6A. Similarly, blocks 710-750 illustrated in FIG. 7 correspond to means-plus-function blocks 710A-750A illustrated in FIG. 7A. More generally, where there are methods illustrated in Figures having corresponding counterpart means-plus-function Figures, the operation blocks correspond to means-plus-function blocks with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for scheduling uplink connections of a mobile station (MS), comprising:
setting a plurality of weight factors for a plurality of Quality of Service (QoS) parameters for different connection scheduling type classifications based on each connection scheduling type classification, the connection scheduling type classifications predefined according to a wireless standard and including at least two of an Unsolicited Grant Service (UGS), a Real-Time Polling Service (RT-PS), an Extended Real-Time Polling Service, a Non-Real-Time Polling Service (NRT-PS), and a Best Effort (BE);
updating a traffic status metric for one or more active connections of the MS, each of the active connections associated with one of the connection scheduling type classifications;
calculating a QoS metric for each of the one or more active connections of the MS based on at least a portion of the plurality of weight factors retrieved for the plurality of QoS parameters and the traffic status metric related to each of the one or more active connections, wherein at least the portion of the plurality of weight factors is retrieved for each of the one or more active connections based on at least the connection scheduling type classification of that active connection;
determining a scheduling order of the one or more active connections of the MS according to the QoS metric for each of the one or more active connections; and
transmitting over at least a portion of the one or more active connections according to the scheduling order.

2. The method of claim 1, further comprising:
assigning a scheduling priority to at least a first connection of the one or more active connections having a larger QoS metric over at least a second connection of the one or more active connections having a smaller QoS metric.

3. The method of claim 1, wherein the plurality of weight factors are set to satisfy the plurality of QoS parameters of each of the one or more active connections of the MS.

4. The method of claim 1, wherein the plurality of QoS parameters comprise at least one of a maximum sustained traffic rate, a minimum reserved traffic rate, or a maximum latency.

5. The method of claim 1, wherein the traffic status metric comprises at least one of a traffic priority factor, a rate factor, and a latency factor.

6. The method of claim 5, further comprising:
calculating the rate factor based on the scheduling type classification of the one or more active connections, an average measured traffic rate, a minimum configured reserved traffic rate and a maximum configured sustained traffic rate; and
calculating the latency factor based on a measured non-allocated interval and a maximum configured latency.

7. An apparatus for scheduling uplink connections of a mobile station (MS), comprising:
at least one processor configured to:
set a plurality of weight factors for a plurality of Quality of Service (QoS) parameters for different connection scheduling type classifications based on each connection scheduling type classification, the connection scheduling type classifications predefined according to a wireless standard and including at least two of an Unsolicited Grant Service (UGS), a Real-Time Polling Service (RT-PS), an Extended Real-Time Polling Service, a Non-Real-Time Polling Service (NRT-PS), and a Best Effort (BE);
update a traffic status metric for one or more active connections of the MS, each of the active connections associated with one of the connection scheduling type classifications;
calculate a QoS metric for each of the one or more active connections of the MS based on at least a portion of the plurality of weight factors retrieved for the plurality of QoS parameters and the traffic status metric related to each of the one or more active connections, wherein at least the portion of the plurality of weight factors is retrieved for each of the one or more active connections based on at least the connection scheduling type classification of that active connection; and
determine a scheduling order of the one or more active connections of the MS according to the QoS metric for each of the one or more active connections; and
a memory coupled to the at least one processor.

8. The apparatus of claim 7, wherein the at least one processor is further configured to assign a scheduling priority to at least a first connection of the one or more active connections having a larger QoS metric over at least a second connection of the one or more active connections having a smaller QoS metric.

9. The apparatus of claim 7, wherein the plurality of weight factors are set to satisfy the plurality of QoS parameters of each of the one or more active connections of the MS.

10. The apparatus of claim 7, wherein the plurality of QoS parameters comprise at least one of a maximum sustained traffic rate, a minimum reserved traffic rate, or a maximum latency.

11. The apparatus of claim 7, wherein the traffic status metric comprises at least one of a traffic priority factor, a rate factor, and a latency factor.

12. The apparatus of claim 11, wherein the at least one processor is further configured to:
calculate the rate factor based on the scheduling type classification of the one or more active connections, an average measured traffic rate, a minimum configured reserved traffic rate and a maximum configured sustained traffic rate; and
calculate the latency factor based on a measured non-allocated interval and a maximum configured latency.

13. An apparatus for scheduling uplink connections of a mobile station (MS), comprising:
means for setting a plurality of weight factors for a plurality of Quality of Service (QoS) parameters for different connection scheduling type classifications based on each connection scheduling type classification, the connection scheduling type classifications predefined according to a wireless standard and including at least two of an Unsolicited Grant Service (UGS), a Real-Time Polling Service (RT-PS), an Extended Real-Time Polling Service, a Non-Real-Time Polling Service (NRT-PS), and a Best Effort (BE);
means for updating a traffic status metric for one or more active connections of the MS, each of the active connections associated with one of the connection scheduling type classifications;
means for calculating a QoS metric for each of the one or more active connections of the MS based on at least a portion of the plurality of weight factors retrieved for the plurality of QoS parameters and the traffic status metric related to each of the one or more active connections, wherein at least the portion of the plurality of weight factors is retrieved for each of the one or more active connections based on at least the connection scheduling type classification of that active connection; and
means for determining a scheduling order of the one or more active connections of the MS according to the QoS metric for each of the one or more active connections.

14. The apparatus of claim 13, wherein the means for determining the scheduling order assigns a scheduling priority to at least a first connection of the one or more active connections having a larger QoS metric over at least a second connection of the one or more active connections having a smaller QoS metric.

15. The apparatus of claim 13, wherein the plurality of weight factors are set to satisfy the plurality of QoS parameters of each of the one or more active connections of the MS.

16. The apparatus of claim 13, wherein the plurality of QoS parameters comprise at least one of a maximum sustained traffic rate, a minimum reserved traffic rate, or a maximum latency.

17. The apparatus of claim 13, wherein the traffic status metric comprises at least one of a traffic priority factor, a rate factor, and a latency factor.

18. The apparatus of claim 17, further comprising:
means for calculating the rate factor based on the scheduling type classification of the one or more active connections, an average measured traffic rate, a minimum configured reserved traffic rate and a maximum configured sustained traffic rate; and
means for calculating the latency factor based on a measured non-allocated interval and a maximum configured latency.

19. A computer-program product for scheduling uplink connections of a mobile station (MS), comprising a non-transitory computer readable medium having instructions stored thereon, the instructions being executable by one or more processors and the instructions comprising:
instructions for setting a plurality of weight factors for a plurality of Quality of Service (QoS) parameters for different connection scheduling type classifications based on each connection scheduling type classification, the connection scheduling type classifications predefined according to a wireless standard and including at least two of an Unsolicited Grant Service (UGS), a Real-Time Polling Service (RT-PS), an Extended Real-Time Polling Service, a Non-Real-Time Polling Service (NRT-PS), and a Best Effort (BE);
instructions for updating a traffic status metric for one or more active connections of the MS, each of the active connections associated with one of the connection scheduling type classifications;
instructions for calculating a QoS metric for each of the one or more active connections of the MS based on at least a portion of the plurality of weight factors retrieved for the plurality of QoS parameters and the traffic status metric related to each of the one or more active connections, wherein at least the portion of the plurality of weight factors is retrieved for each of the one or more active connections based on at least the connection scheduling type classification of that active connection; and
instructions for determining a scheduling order of the one or more active connections of the MS according to the QoS metric for each of the one or more active connections.

20. The computer-program product of claim 19, wherein the instructions further comprise:
instructions for assigning a scheduling priority to at least a first connection of the one or more active connections having a larger QoS metric over at least a second connection of the one or more active connections having a smaller QoS metric.

21. The computer-program product of claim 19, wherein the plurality of weight factors are set to satisfy the plurality of QoS parameters of each of the one or more active connections of the MS.

22. The computer-program product of claim 19, wherein the plurality of QoS parameters comprise at least one of a maximum sustained traffic rate, a minimum reserved traffic rate, or a maximum latency.

23. The computer-program product of claim 19, wherein the traffic status metric comprises at least one of a traffic priority factor, a rate factor, or a latency factor.

24. The computer-program product of claim 23, wherein the instructions further comprise:
instructions for calculating the rate factor based on the scheduling type classification of the one or more active connections, an average measured traffic rate, a minimum configured reserved traffic rate and a maximum configured sustained traffic rate; and instructions for calculating the latency factor based on a measured non-allocated interval and a maximum configured latency.

\* \* \* \* \*